(No Model.) 2 Sheets—Sheet 1.
H. C. LEWIS.
SPLIT PULLEY.
No. 437,125. Patented Sept. 23, 1890.
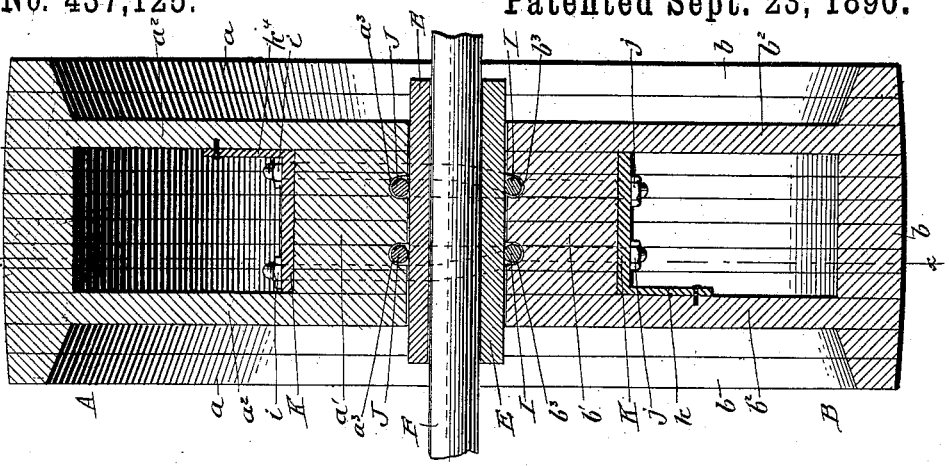
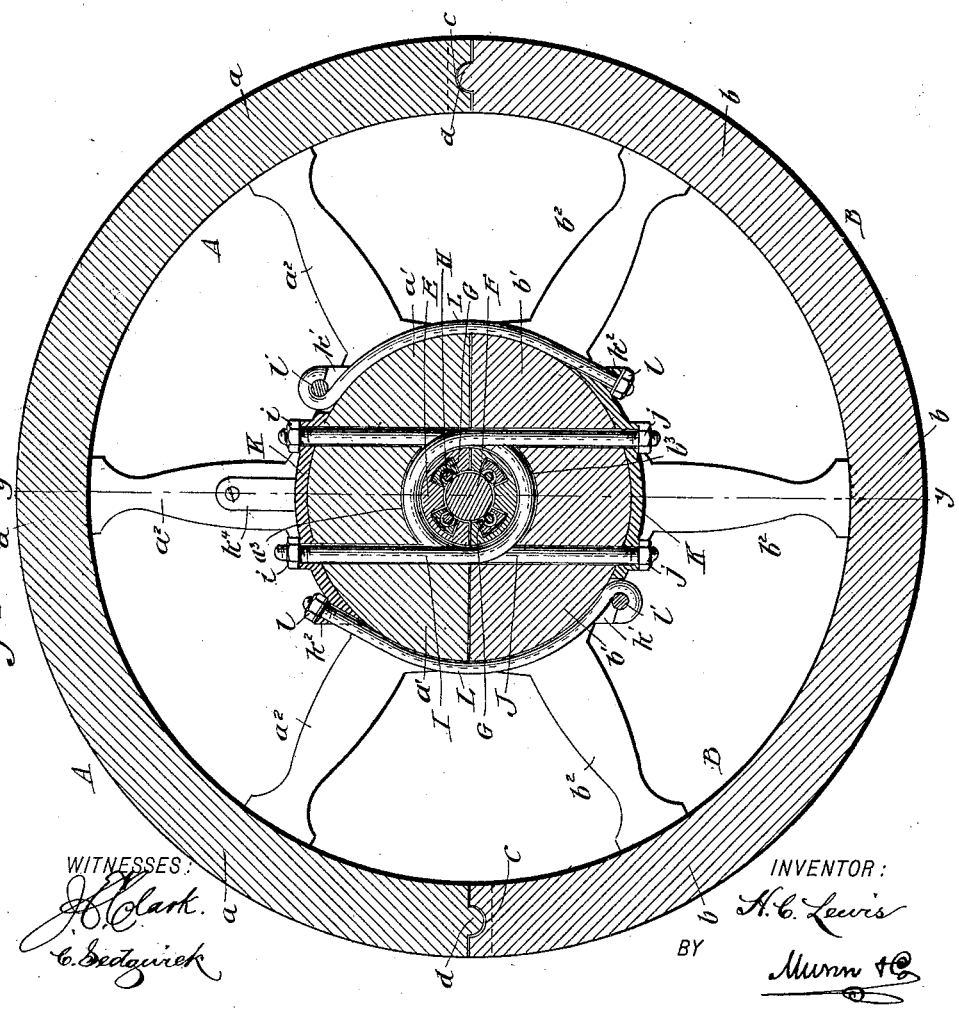
WITNESSES:
J. C. Clark.
C. Sedgwick.
INVENTOR:
H. C. Lewis
BY
Munn & Co.
ATTORNEYS.

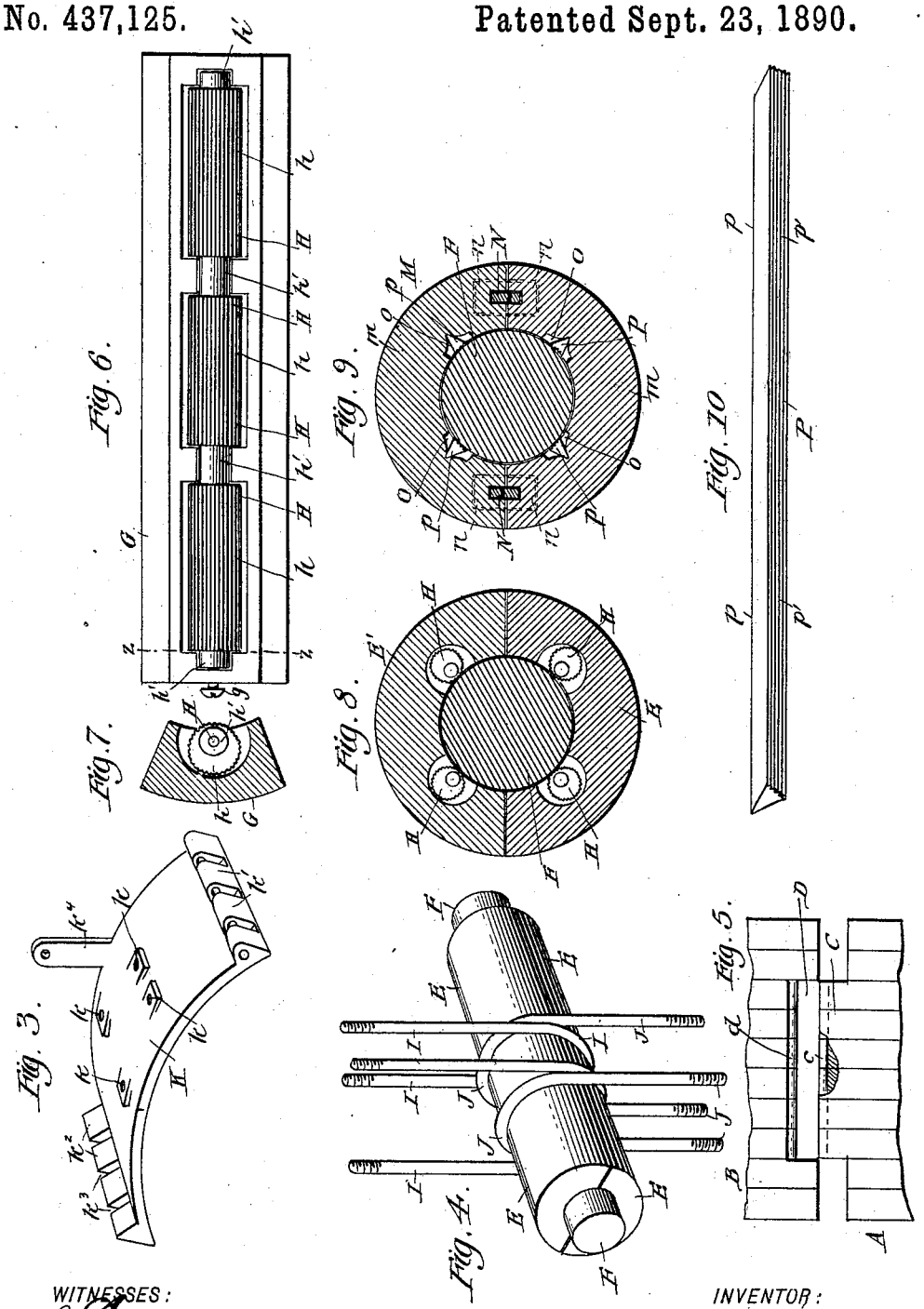

UNITED STATES PATENT OFFICE.

HENRY C. LEWIS, OF SAGINAW, MICHIGAN, ASSIGNOR TO HIMSELF AND JOHN F. BARROWS, OF SAME PLACE.

SPLIT PULLEY.

SPECIFICATION forming part of Letters Patent No. 437,125, dated September 23, 1890.

Application filed August 31, 1889. Serial No. 322,504. (No model.)

*To all whom it may concern:*

Be it known that I, HENRY C. LEWIS, of Saginaw, in the county of Saginaw and State of Michigan, have invented a new and Improved Split Pulley, of which the following is a full, clear, and exact description.

My invention relates to split pulleys, those made of wood more particularly, and has for its object to provide a simple, comparatively inexpensive, and efficient power-transmitting pulley of this character which may very quickly and easily be applied to or removed from a driving-shaft and will not turn independently on the shaft under heavy strains and will retain a perfect center and run true at its peripheral belt-face.

The invention consists in certain novel features of construction and combinations of parts of the split pulley, all as hereinafter described and claimed.

Reference is to be had to the accompanying drawings, forming a part of this specification, in which similar letters of reference indicate corresponding parts in all the figures.

Figure 1 is a side view of one of my improved split pulleys in vertical section on the line $x$ $x$ in Fig. 2. Fig. 2 is a central transverse or diametrical section of the pulley, taken on the line $y$ $y$ in Fig. 1. Fig. 3 is a perspective view of one of the pulley-hub clamp-plates. Fig. 4 is a perspective view of the pulley-saddles and their transverse clamping-bolts and a portion of a shaft to which it may be supposed the pulley is fitted. Fig. 5 is a face view of the peripheral joint of the two sections of the pulley. Fig. 6 is an inside face view of one of the metal cam-bushings adapted to a split pulley having wooden saddles next the shaft. Fig. 7 is an end view and cross-section of the cam-bushing, taken on the line $z$ $z$ in Fig. 6. Fig. 8 is a transverse sectional view of metal saddle-plates fitted with cams bearing on the pulley-shaft. Fig. 9 is a transverse section of a small solid pulley fitted with cams of a modified form and bearing on the pulley-shaft, and Fig. 10 is an enlarged perspective view of one of the shaft-gripping cams shown in Fig. 9.

I will particularly describe my split pulley with reference first to Figs. 1 to 7, inclusive, of the drawings.

The pulley is made with two main sections A B, having, respectively, semicircular rim portions $a$ $b$, hub portions $a'$ $b'$, and spokes $a^2$ $b^2$ connecting the rim and hub parts. Each of these half-sections is built up of a number of layers of wood glued together face to face in a well-known manner and as shown in Figs. 2 and 5 of the drawings. The pulley shown has radiating pairs of spokes or six spokes in each section A B; but the number and arrangement of the spokes may vary with the size and width of face of the pulley.

The rim portions of the two pulley-sections A B are tongued and grooved together in a manner preventing radial or lateral movement of the pulley-sections on each other at their rim-joints. The end of the rim of one section is provided with a tongue or tenon C, which fits into a mortise or opening D in the end of the other section, and the base of the mortise is provided with a central tongue or rib $d$, which locks into a groove $c$, made along the center of the tongue or tenon C, as shown in Figs. 1 and 5 of the drawings.

The wooden hubs $a'$ $b'$ of the pulley-sections are provided with opposite semicircular transversely-ranging recesses, which receive the two semicircular saddle-pieces E E, through which passes the shaft F, on which the pulley is fitted. These saddles are each provided with undercut or dovetail-shaped recesses, into which are snugly fitted the metal bushings G, each of which carries a cam device H, adapted to grip the pulley-shaft. I show each of the two bushings G provided with two cam-grips H H, but there may be but one grip or more than two, as the size of the pulley or the work it does may require.

The construction of the cam-grip device is best shown in Figs. 6 and 7 of the drawings, and it consists, simply, of a shaft $h'$, on which are turned eccentrically a series of cams $h$. Three cams are shown, but there will be as many as the width of the pulley may require. The shaft $h'$ at both ends and at places between the cams $h$ is journaled in bearings provided for it in the bushing G, and a screw $g$, passed through the end of the bushing against the shaft serves to bind the shaft fast, so as to hold the smaller radius of the cams inward or presented to the pulley-shaft while the pulley is being adjusted thereon. The faces of the cams $h$ are preferably fluted, corrugated, or roughened to cause them to grip or bite the pulley-shaft. These corrugations or serrations are shown ranging longitudinally along the peripheries of the cams, but they may range spirally or otherwise on them, if preferred. After the cam-grip-holding bushings G are slipped into the saddles E E of the pulley, the two-limbed or U-shaped clamping-bolts I J are placed on the saddles, as shown in Fig. 4 of the drawings, and after the threaded ends of these bolts I J are passed through holes provided for them in the hubs $a'$ $b'$ of the pulley-sections A B, respectively, and also through holes $k$, provided for them in the outside hub-clamp plates K K, nuts $i j$ are screwed upon the ends of the bolts to draw their semicircular or bent center parts closely to the saddles E E from opposite directions, and thus not only bind the semicircular saddles securely to each other, but materially help to lock the two hub portions of the pulley to each other. These hub-sections are provided with internal grooves $a^3 b^3$, which receive the bent center parts of the clamping-bolts I J. (See Figs. 1 and 2 of the drawings.) I show but two pairs of these bolts, but there will be as many of them as the width of the pulley requires. Instead of using nuts $i j$ on the bolts I J, the bolt ends may be slotted to receive keys for clamping the parts.

The above-mentioned clamp-plates K K are made alike, and, as shown in Fig. 3 of the drawings, at one end each clamp-plate is provided with a series of lugs $k'$, to and between which are hung or hinged by a pin $l'$ a series of clamp-rods L, which at their other free ends are screw-threaded and provided with nuts $l$, which are tightened up on top of a series of lugs $k^2$, formed at one end of the opposite clamp-plate K, after the ends of the rods inside the nuts are slipped into slots $k^3$, formed between the lugs $k^2$. Washers are preferably interposed between the nuts $l$ and the lugs $k^2$. The clamp-plates K K thus are each provided at one end with lugs $k'$ and at the other end with lugs $k^2$ and slots $k^3$, allowing the clamp-rods L hung to one plate to be tightened up on the lugs $k^2$ of the other plate for binding both clamp-plates securely upon the pulley-hub to re-enforce the clamping action of the U-shaped bolts I J, above described. When these clamping-bolts are tightened, the peripheral diametrically-opposite joints at C D of the pulley-rim will also be tightened, and as these joints are made to prevent radial or lateral shifting of the pulley-rim the entire pulley structure will be most securely bound together to resist heavy strains successfully while allowing the pulley to be easily applied to or removed from a shaft by any person of ordinary intelligence. The clamp-plates K are each provided with a lug $k^4$, which is screwed or bolted to the face of one of the pulley-spokes, and assists in holding the plate in place and also in bracing the pulley-rim from the hub.

It will be noticed that when the pulley is placed on a shaft, as above described, any tendency of the pulley to slip around on the shaft in either direction will be almost instantly checked by the cam-grips H, which, as above stated, are set normally with the smaller radius of their cams $h$ next the shaft; hence should the strain on the pulley tend to turn it on the shaft the grips H will be turned and their cams $h$ will bite all the harder on the shaft, and will effectually lock the pulley thereto.

Fig. 8 of the drawings illustrates how the cam-grips H may be journaled directly in metal saddle-pieces E' E', which will be fitted directly on the shaft F, like the wooden saddles E E; but in this case the independent metal bushings G, which are fitted into the wooden saddles E, are dispensed with.

Figs. 9 and 10 of the drawings show a modified form of cam device applied to a small spokeless pulley M, which is made in two parts $m m$, each of which is provided next the joint with two or more projecting lugs $n$, which enter opposing cavities in the other part or section. The body parts of the two sections and also the lugs $n n$ are slotted transversely or in line with the axis of the shaft F, on which the pulley is placed, and pairs of keys N N are driven into the lug-slots to draw and bind the two half-sections of the pulley securely together. The pulley-sections $m m$ are each provided with one or more transverse recesses O, opening to the bore of the pulley and formed with a central depression or notch which receives the angular edge $p$ of a segmental or angularly-formed cam P, the face $p'$ of which opposite its bearing-edge $p$ is preferably serrated or corrugated or roughened, as best shown in Fig. 10, to grip the pulley-shaft. With this construction it is obvious that should the pulley M tend to turn in either direction on the shaft F the cams P will turn a little and thereby bite the shaft all the harder and hold the pulley securely in place.

Having thus described my invention, what I claim as new, and desire to secure by Letters Patent, is—

1. A split pulley provided with rim and hub sections, opposite curved clamp-plates resting on the hub-sections, and opposite rods curved to fit the hub-sections between and connecting the ends of said plates, substantially as set forth.

2. The combination, in a split pulley having the meeting faces of its two hub portions recessed to form a bore through the hub, of saddle-pieces extending through said bore and shaped externally to fit hub-recesses and having their inner shaft-engaging faces recessed between their ends, and cams in said recesses to engage and bind the pulley to the shaft, substantially as set forth.

3. The combination, in a split pulley, of parts or sections having hub and rim portions and inner saddle-pieces in the hub next the bore, and two-limbed bolts clamping the saddles by their center bends and extending in opposite directions through the pulley-hub, substantially as herein set forth.

4. The combination, in a split pulley, of parts or sections having hub and rim portions, saddles held within the hub parts, cam-grips held within the saddles next the pulley-bore, and two-limbed bolts clamping the saddles by their center bends and extending in opposite directions through the pulley-hub, substantially as herein set forth.

5. The combination, in a split pulley, of parts or sections having hub and rim portions, and inner saddle-pieces next the pulley-bore, two-limbed bolts clamping the saddles by their center bends and extending in opposite directions through the pulley-hub, opposite clamp-plates outside the hub and through which these two-limbed bolts also pass, nuts on said bolts outside the clamp-plates, and clamping-bolts applied between the ends of the plates onto the hub, substantially as herein set forth.

6. In a split pulley, the combination of parts or sections having hub and rim portions, saddle-pieces E E, held in the hub next the pulley-bore, and two-limbed bolts I J, fitted around the saddles and extending through the hub, substantially as herein set forth.

7. In a split pulley, the combination of parts or sections having hub and rim portions, saddle-pieces in the hub, shaft-grips comprising bushings G and cams H, journaled therein and facing the pulley-bore, and two-limbed bolts I J, fitted at their bends around the saddles and extending through the pulley-hub, substantially as herein set forth.

8. In a split pulley, the combination of parts or sections having hub and rim portions, saddle-pieces in the hub, shaft-grips comprising bushings G and cams H, journaled therein and facing the pulley-bore, clamp-plates K K, outside the hub, two-limbed bolts I J, fitted at their bends around the saddles and extending in opposite directions through the pulley-hub and its clamp-plates K K, nuts on the bolts outside the clamp-plates, and bolts L, hung to one end of the clamp-plates and engaging the other end of said plates, substantially as set forth.

9. In a split pulley made in sections having hub and rim portions and provided with saddle-pieces next its bore, said saddles provided with shaft-grips consisting of bushings G and grips H, having cams $h$ and journals $h'$, and fitted in the bushings, substantially as herein set forth.

10. In a split pulley, the combination, with its parts or sections having hub and rim portions, of clamp-plates K K, applied outside the pulley-hub and provided at one end with lugs $k'$ and at the other end with lugs $k^2$ and slots $k^3$, and bolts L, hinged to the lugs $k'$ and adapted to enter the plate-slots $k^3$, and nuts $l$ on the bolts outside the lugs $k^2$, substantially as herein set forth.

HENRY C. LEWIS.

Witnesses:
ENOS L. GREGORY,
WILLIAM J. SCHULTZ.